United States Patent [19]

Uiga

[11] 4,365,891

[45] Dec. 28, 1982

[54] COPY CAMERA FOCUSING

[75] Inventor: Endel Uiga, Rockaway, N.J.

[73] Assignee: Cordell Engineering, Inc., Peabody, Mass.

[21] Appl. No.: 283,623

[22] Filed: Jul. 15, 1981

[51] Int. Cl.³ .................... G03B 27/36; G03B 27/38
[52] U.S. Cl. .................................. 355/59; 354/198; 355/77
[58] Field of Search ................... 355/18, 55, 58, 59, 355/61, 62, 77; 354/273, 289, 198

[56] References Cited

U.S. PATENT DOCUMENTS 3,832,058  8/1974  Gusovius ........................... 355/614

Primary Examiner—Richard A. Wintercorn
Attorney, Agent, or Firm—Charles Hieken

[57] ABSTRACT

A copy camera has a lens board positioned by a lens lead screw and a copyboard positioned by a copyboard lead screw. A ratio-selecting knob rotates the shaft of a lens counter that is connected by a flexible coupling to spur gears that rotate the lens feed screw so that the count in the lens counter corresponds to the ratio of image size to object size. Spur gears intercouple the lens counter shaft to the tape advance drum that carries a tape with numbers denoting a copyboard counter setting for establishing an object distance between copyboard and lens for maintaining an object at that distance in sharp focus for attaining the ratio indicated in the lens counter. A copyboard setting knob rotates the copyboard counter shaft that is connected by a flexible coupling to the copyboard lead screw to enable an operator to set the copyboard counter to the value displayed on the tape drum. A one-way switch causes a lightbulb to illuminate the number displayed by the tape drum for each whole percent setting of the lens counter.

11 Claims, 5 Drawing Figures

COPY CAMERA FOCUSING

The present invention relates in general to focusing copy or process cameras and more particularly concerns novel apparatus and techniques for conveniently focusing copy or process cameras rapidly, easily, accurately and conveniently for virtually any degree of magnification or reduction with apparatus that is relatively inexpensive, reliable and operable by relatively unskilled personnel in the dim light of a dark room.

Focusing a process or copy camera for a prescribed magnification of reduction ratio of image size to object size involves changing both the distance between lens and film (image distance) and that between lens and copyboard (object distance), typically by rotating two lead srews. One typical prior art approach for determining the correct amount of rotation involves tapes or rods fastened to the lens and copyboard assemblies. The tapes or rods are marked with correct settings for certain magnification and reduction ratios. This approach is convenient and fast but not accurate enough for obtaining optimum focus with precision cameras.

A second approach involves using mechanical counters connected to lead screws. An accompanying chart lists the setting of each counter for a sequence of magnification and reduction ratios. This method provides sufficient accuracy for optimum focus with precision cameras; however, it is inconvenient because the operator must read the tables for each desired magnification or reduction and then set the counters accordingly. This method is especially inconvenient in a dark room where reading in the dim light is difficult.

Accordingly, it is an important object of this invention to provide improved apparatus and techniques for accurately focusing copy or process cameras over a wide range of magnification and reduction ratios.

It is another object of the invention to achieve the preceding object with apparatus and techniques that may be readily implemented with relatively inexpensive reliable additional apparatus.

It is still a further object of the invention to achieve one or more of the preceding objects while facilitating rapid accurate focusing by relatively unskilled personnel in dim light.

According to the invention, there is lens counting means coupled to the lens lead screw for providing a ratio numerical display that is numerically equal to the ratio of image size to object size in percent for which the image distance is set. There is means associated with the lens positioning assembly for displaying a number representative of the copyboard counter setting for optimum focusing at the percent ratio indicated by the ratio numerical display.

Typically the lens counting means is coupled to the lens lead screw by mechanical means, such as a gear train, or electrical means to effectively introduce a scale factor that causes the number displayed as the lens lead screw is rotated to be numerically equal to the ratio of image size to object size for which the image distance is set. An exemplary arrangement for displaying the number to which the copyboard counter should be set may comprise a moving tape containing a set of numbers for each whole percent ratio with the tape transport coupled either to the lens counting means or the lens carrier assembly so that a window exposes the number of the tape corresponding to the copyboard counter setting for the percent ratio to which the image distance is then set.

According to another aspect of the invention, there is a light source for illuminating the tape, and means for energizing the light source only when a proper number is exposed in the window for setting the copyboard counter for a whole percent ratio. Typically this means may comprise a switch that is actuated only when the lens lead screw is turned in a particular direction to minimize backlash and insure accurate setting. According to still another aspect of the invention, the copyboard lead screw may be rotated by a servo motor, there may be means for providing a signal representative of the setting of the copyboard counter and of the desired setting, and means for comparing the two signals to actuate the copyboard lead screw until the copyboard counter count corresponds to the desired count.

Numerous other features, objects and advantages of the invention will become apparent from the following specification when read in connection with the accompanying drawing in which.

Figure 1:
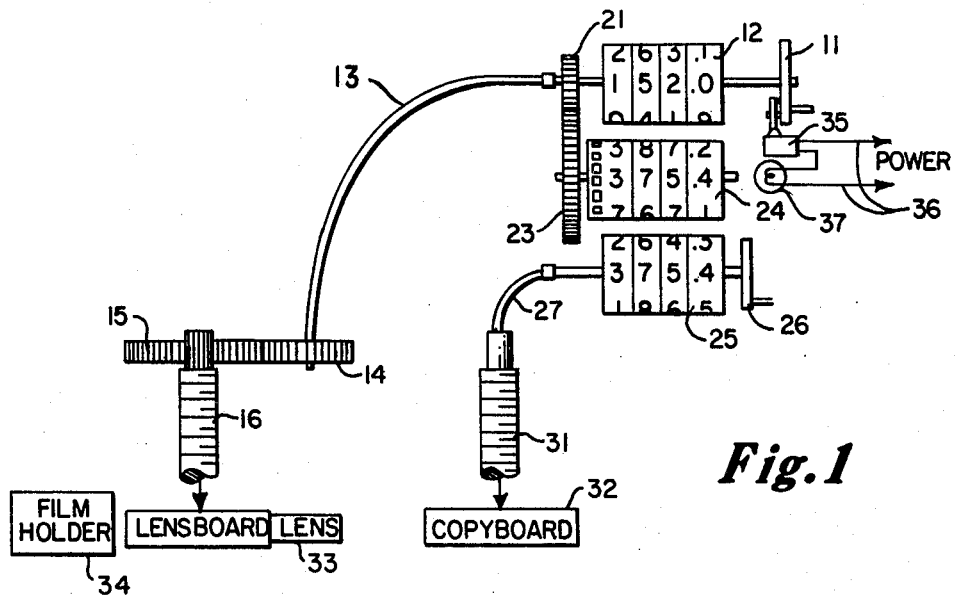
FIG. 1 is a combined block-pictorial representation of a system according to the invention.

With reference now to the drawing and more particularly FIG. 1 thereof, there is shown a combined block-pictorial representation of a preferred embodiment of the invention. An operator may rotate ratio selecting knob 11 so that lens counter 12 displays the desired percentage magnification while simultaneously rotating flexible shaft coupling 13 to rotate spur gear 14 that meshes with spur gear 15 to rotate lens board feed screw 16 and position lens board 17 for the magnification or reduction ratio in percentage displayed in lens counter 12. The rotation produced by ratio selecting knob 11 also rotates spur gear 21 meshing with spur gear 23 to rotate the advance drum 24 one position for each one percent change displayed by lens counter 12 to display a number corresponding to the correct setting of copyboard counter 25 for each whole percent setting of lens counter 12. The operator may then rotate copyboard positioning knob 26 until copyboard counter 25 displays the same number as displayed on tape advance drum 24. Flexible shaft coupling 27 transmits the rotation imparted by copyboard positioning knob 26 to copyboard lead screw 31 to position copyboard 32 at the correct spacing from lens 33 for attaining the magnification or reduction ratio in percent displayed in lens counter 12 while precisely focusing upon film holder 34 the image of the item to be photographed carried by copyboard 32.

A one-way switch 35 is closed once for each revolution of knob 11 when the tenth percent in lens counter 12 is zero as shown and knob 11 has been rotated in a predetermined direction to connect electrical power received at terminals 36 to energize bulb 37 and illuminate the count displayed by tape advance drum 24 for each whole pecent ratio when knob 11 is rotated in the predetermined direction to insure accurate lens board positioning.

Figure 2:
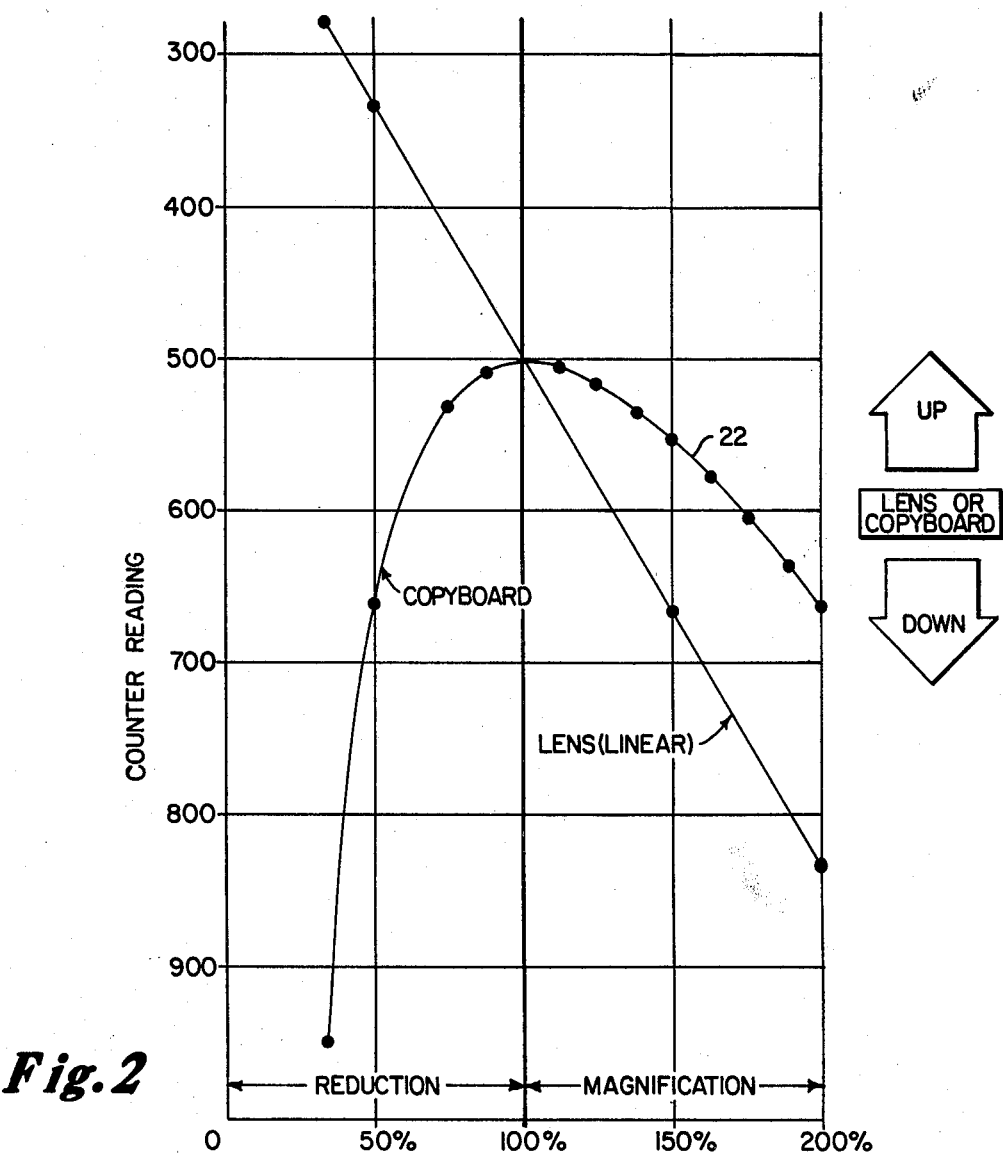
FIG. 2 is a graphical representation of counter settings as a function of ratio for a typical prior art copy camera.

The invention takes advantage of the well-known linear relationship between image distance between lens and film plane and the ratio of image size to object size. However, the object distance between copyboard and lens as a function of this ratio is nonlinear, reaching a minimum (maximum copyboard height) for 100 percent. Referring to FIG. 2, there is shown a graphical representation of typical counter readings for lens position and copyboard position as a function of magnification and reduction for a 210 mm lens of the commercially available Compugraphic 1418 and 1418B copy camera system. The ratio of spur gears 14 and 15 is selected to establish a scale factor such that lens counter 12 reads directly in percentage magnification or reduction. The ratio of spur gears 21 and 23 is selected so that for each change of one whole percent, tape advance drum 25 advances the displayed number by one increment.

Figure 3:
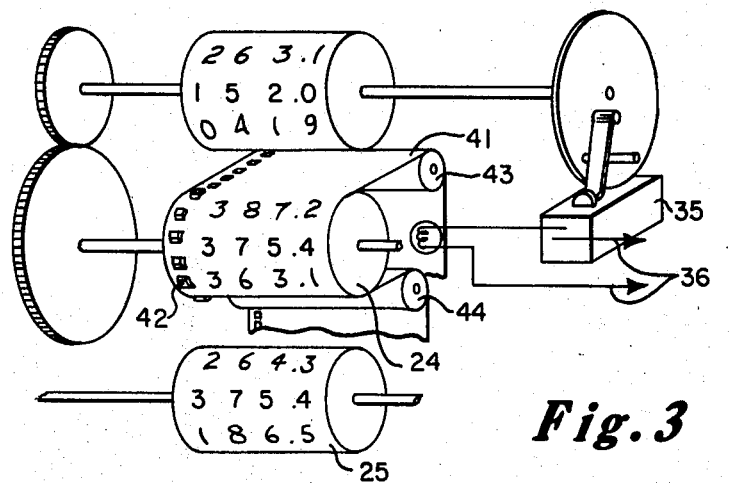
FIG. 3 is a pictorial representation of details of an exemplary tape display according to the invention.

Referring to FIG. 3, there is shown a more detailed pictorial representation of how tape 41 carries the numbers of the setting of copyboard counter 25 for each whole percent ratio of magnification or reduction, thus effectively carrying a digital number corresponding to the ordinate of FIG. 2 for each whole percent of the abscissa on copyboard curve 22. Tape 41 is formed with sprocket openings, such as 42, that mate with sprockets carried by tape advance drum 24 as tape 41 winds on and unwinds from end drums 43 and 44.

Figure 4:
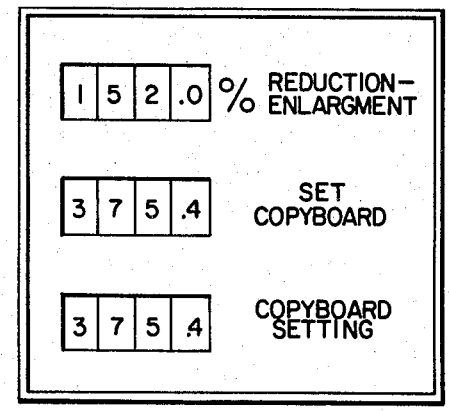
FIG. 4 shows an enlargement of the display area.

Referring to FIG. 4, there is shown a typical panel display observed by an operator through windows in a housing accommodating counters 12 and 25 and tape advance drum 24.

The invention is readily operable by a relatively unskilled operator. The operator need only rotate ratio selecting knob 11 until lens counter 12 displays the desired percentage magnification or reduction ratio. Then the operator need only adjust knob 26 until the count displayed there corresponds to the count displayed by tape advance drum 24. If it is desired to attain a ratio to a particular tenth of a percent, the operator need only adjust ratio selecting knob 11 until the desired percentage of magnification or reduction is displayed in lens counter 12 and then adjust copyboard counter 25 to an interpolated setting between the setting for each adjacent full percent. For example, if it were desired to attain a magnification of 152.5%, the operator would set copyboard counter to 381.3, midway between the setting of 375.4 for 152.0 percent and 387.2 for 153.0 percent.

Figure 5:
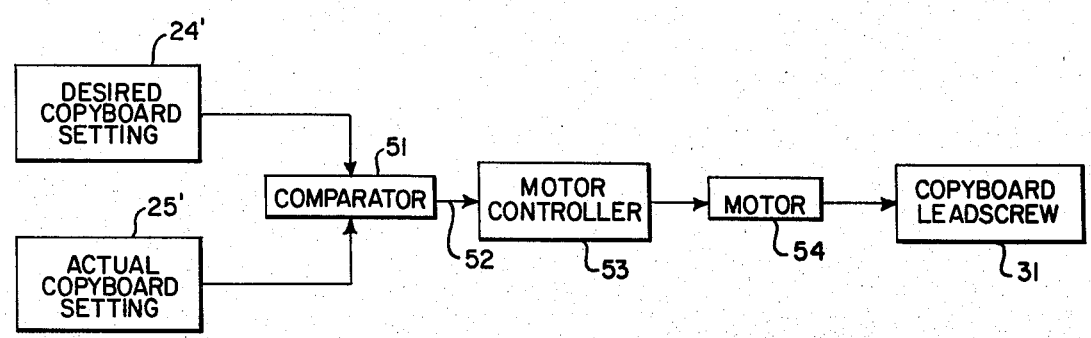
FIG. 5 is a block diagram illustrating the logical arrangement of a system according to the invention for automatically positioning the copyboard.

Referring to FIG. 5, there is shown a block diagram illustrating the logical arrangement of a system for automatically positioning copyboard 32. The system may be essentially as shown in FIG. 1 with copyboard positioning implemented with the apparatus of FIG. 5. The desired copyboard setting displayed by tape advance drum 24 may be provided in electrical form by desired copyboard setting 24' through appropriate transducing techniques well-known in the art. For example, tape 40 may binarily encode each decimal digit for reading by suitable photoelectric transducers in accordance with well-known techniques. Similarly, the actual copyboard setting of counter 25 may be suitably transduced to provide an electrical representation of the actual copyboard setting by transducer 25'. Comparator 51 may then compare the signals provided by transducers 24' and 25' to provide an error signal on line 52 that is delivered to motor controller 53 to actuate motor 54 to position copyboard lead screw 31 until actual and desired copyboard settings coincide. With this apparatus an operator need only set the desired percent ratio and copyboard 32 would then be moved to the correct position for the desired ratio that maintains optimum focus.

The specific embodiments described herein are by way of example for illustrating the best mode now contemplated for practicing the invention. The counter may comprise electronic circuits with a digital display, using for example an electronic look-up table that associates each desired percentage with a corresponding setting for the copyboard counter. The scaling for converting image distance to exact percentage reading, shown accomplished mechanically in FIG. 1, may be accomplished electrically through digital or analog techniques. Numerous other uses and modifications of and departures from the specific embodiments described herein may be practiced by those skilled in the art without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. In a copy camera having lens means for focusing the image of an object location separated therefrom by an object distance upon an image plane separated therefrom by an image distance to establish a predetermined ratio of image size to object size with said ratio being linearly and nonlinearly related to said image distance and object distance, respectively, apparatus comprising,
   means for adjusting said image distance to establish a predetermined value for said ratio,
   means responsive to adjustment of said image distance for displaying said ratio in numerical form with digits each being the same as those specifying said value,
   and means responsive to the setting of said image distance for providing an indication of said object distance for attaining the displayed ratio value while sharply focusing the image of the object at that object distance in a plane at that image distance.

2. Apparatus in accordance with claim 1 and further comprising,
   means for adjusting said object distance to the indication provided by said means responsive to the setting of said image distance.

3. Apparatus in accordance with claim 2 and further comprising,
   means associated with the means for adjusting said object distance for providing a numerical display representative of said distance.
   said means responsive to the setting of said image distance including means for providing a numerical display representative of the object distance for attaining said displayed ratio value,
   whereby said means for adjusting the object distance may be adjusted until the numerical value representative of the adjusted object distance corresponds to the numerical value displayed by said means responsive to the setting of said image distance.

4. A method of manipulating a copy camera having lens means for focusing the image of an object location separated therefrom by an object distance upon an image plane separated therefrom by an image distance to establish a predetermined ratio of image size to object size with said ratio being linearly and nonlinearly related to said image distance and object distance respectively, means for adjusting said image distance to establish a predetermined value for said ratio, means responsive to adjustment of said image distance for displaying said ratio in numerical form with digits each being the same as those specifying said value, and means for adjusting said object distance to the indication provided by said means responsive to the setting of said image distance which method includes the steps of, adjusting said image distance to establish said predetermined value for said ratio, observing said indication of said object distance for attaining the displayed ratio value and the visual display representative of object distance, and adjusting the object distance until the latter two indications coincide.

5. Apparatus in accordance with claim 3 wherein said means responsive to the setting of said image distance comprises a member with a sequence of numbers each corresponding to a particular one of said displayed ratio values, masking means for exposing one of said values at a time, and means for mechanically intercoupling said means for adjusting said image distance and said means responsive to adjustment of said image distance to expose that one of said object distance indications for attaining the then-displayed ratio value.

6. Apparatus in accordance with claim 5 wherein said member comprises a tape bearing a sequence of numbers, tape advance drum means for advancing said tape, and spur gear means intercoupling said tape advance drum means and said means for adjusting said image distance.

7. Apparatus in accordance with claim 3 and further comprising means for providing a visible indication on said numerical display each time said predetermined value corresponds to a whole percentage.

8. Apparatus in accordance with claim 7 wherein said means for providing a visible indication comprises light bulb means for selectively illuminating said numerical display, and one-way switching means for delivering energy to said light bulb means only when said predetermined value is a whole percentage established by moving said means for adjusting only a predetermined one of two possible adjusting directions.

9. Apparatus in accordance with claim 1 wherein said means responsive to adjustment of said image distance comprises, a digital counter for displaying said value, and scale factor means for coupling said digital counter to the means for adjusting said image distance for establishing the displayed ratio in numerical form with digits each being the same as those specifying said value.

10. Apparatus in accordance with claim 9 wherein said means for adjusting comprises a lead screw for positioning said lens means and said scale factor means comprises gear means for rotating the lens lead screw.

11. Apparatus in accordance with claim 2 wherein said means for adjusting comprises control means responsive to a signal representative of the object distance for attaining the displayed ratio value while sharply focusing the image of the object at the object distance in a plane at that image distance and the actual object distance for adjusting said object distance for reducing the difference between the latter two signals.

* * * * *